United States Patent [19]

Balzer et al.

[11] 4,323,735
[45] Apr. 6, 1982

[54] KEY TELEPHONE LINE SHUNT DETECTOR CIRCUIT

[75] Inventors: Gerry C. Balzer, Freehold; Alan M. Gordon, Matawan, both of N.J.

[73] Assignee: Bell Telephone Laboratories, Inc., Murray Hill, N.J.

[21] Appl. No.: 191,143

[22] Filed: Sep. 26, 1980

[51] Int. Cl.³ .............................................. H04M 1/00
[52] U.S. Cl. ............................................... 179/99 LC
[58] Field of Search .......... 179/99 LC, 18 F, 18 FA, 179/81 R

[56] References Cited

U.S. PATENT DOCUMENTS

| | | | |
|---|---|---|---|
| 3,436,488 | 4/1969 | Banbato et al. | 179/99 LC |
| 4,039,763 | 8/1977 | Angner et al. | 179/99 LC |
| 4,057,693 | 11/1977 | Angner et al. | 179/99 LC |
| 4,087,646 | 5/1978 | Brolin et al. | 179/18 FA |
| 4,093,830 | 6/1978 | Pappas | 179/99 LC |
| 4,101,740 | 7/1978 | Barsellotti | 179/99 LC |
| 4,101,741 | 7/1978 | Kunstatter | 179/99 LC |

*Primary Examiner*—Gerald L. Brigance
*Attorney, Agent, or Firm*—John A. Caccuro

[57] ABSTRACT

A line circuit is disclosed for controlling communications over a communication pair between a switching machine and a key telephone station. The line circuit includes a dual sensitivity shunt detector arrangement (103, 104, 105) for improved detection of dc transients and ac ringing voltage signals appearing across the pair. A current diverter circuit (104) switches the sensitivity of the shunt detector arrangement depending on the operating state of the key telephone station.

13 Claims, 2 Drawing Figures

KEY TELEPHONE LINE SHUNT DETECTOR CIRCUIT

TECHNICAL FIELD

This invention relates generally to an improved key telephone line circuit, and, more particularly, to a detector circuit of a key telephone line circuit connected in parallel across the communication leads.

BACKGROUND OF THE INVENTION

In U.S. Pat. No. 4,057,693 issued Nov. 8, 1977 to R. J. Angner et al, there is disclosed a key telephone line circuit which is connected in shunt (parallel) across the tip and ring lead communication path (loop) between the central switching machine and the subscriber's station to control the HOLD, BUSY and IDLE conditions of the station and to provide the necessary visual and audible signaling to the stations.

Shunt control of a line circuit has several advantages, but a principal one is the perfect balance of the tip and ring circuitry at all times. Other advantages include the ease of application of music and tone-on-hold signals and the fact that the circuit can be removed for maintenance in any state but HOLD without disrupting customer service.

The line circuit disclosed in the above-identified patent includes a shunt detector which provides the following functions:

1. To detect CO ringing and yet differentiate between ringing signals and other signals or noise to prevent false ring-up.
2. To detect large voltage transitions generated across the line when the subscriber telset network is connected (OFF-HOOK) across and disconnected (ON-HOOK) from the line.
3. To provide a path for loop current flow through the hold bridge when the circuit is in HOLD and allow detection of CO open intervals.

The above shunt detector is optimized to provide for detection of signals as diverse as ringing and switchhook transients. However, in certain applications, test signals and switchhook flashing (flashhook) signals cause an erroneous output from the above shunt detector. In such applications, during certain operating states large test signals are to be ignored by the shunt detector while under other operating states smaller transient flashhook signals are to be detected by the shunt detector. Thus, existing shunt detectors may erroneously detect rather than ignore the test signals while erroneously ignoring a valid flashhook signal.

SUMMARY OF THE INVENTION

The foregoing signal detection problems of existing shunt detectors are solved by a dual sensitivity shunt detector having a sensitivity which is changed according to the operational state of the subscriber's key telephone station. The shunt detector is switched between two sensitivity levels using a current diverter arranged to divert current around the shunt detector during certain telephone operational states. The current diverter uses a light coupled transistor (LCT) circuit which diverts current around the shunt detector in response to a NON-BUSY state signal on the A-lead. During the NON-BUSY states (IDLE, RING, or HOLD) the LCT circuit diverts current from the shunt detector thus achieving a reduced detector sensitivity. During the BUSY state (A lead at ground) the LCT circuit is disabled and hence an increased shunt detector sensitivity results since no current is diverted. The LCT circuit is bidirectional, permitting a current diverting capability to either polarity of voltage across the communication path (T and R leads). Additionally, a varistor element is added to the shunt detector coupler circuit to provide a threshold level which prevents the shunting of normal speech and TOUCH-TONE signals during the BUSY state.

BRIEF DESCRIPTION OF THE DRAWING

The principles of the invention will be fully appreciated from the illustrative embodiment shown in the drawing, in which.

DETAILED DESCRIPTION

The overall operation of a line circuit in a key telephone environment is well known. For example, see U.S. Pat. No. 3,436,488 issued to R. E. Barbato et al on Apr. 1, 1969. While the disclosed line circuit is of the shunt detector design the basic operating modes are the same as described in the Barbato patent. A shunt detector type line circuit connects in parallel across the communicating pair connecting the CO or PBX to the key station. The operation of a typical shunt detector type line circuit as shown herein in FIG. 2 is described in the above-identified Angner et al patent which is incorporated by reference herein.

Briefly, the operation of the Angner shunt detector can be described with reference to FIG. 2. Shunt detector 103 connects across the T and R leads of the communication pair and detects ac ring signals for ring control while also detecting dc transient signals for hold and disconnect control. A ring signal received from the CO or PBX is provided via ring-up capacitor 1C1, resistors 1R2, 1R3 and 1R4 and varistor 1V1 to shunt detector 103. The resulting conduction of light emitting diodes 1D1 and 1D2 illuminates light coupled transistors 1Q1 and 1Q2 causing a signal on lead DIN of control circuit IC1. Signal DIN together with other inputs cause control circuit IC1 to enter the RING state. In a similar manner, the transient signals on the T and R leads which occur when the connected key station set goes ON-HOOK or OFF-HOOK are also detected by shunt detector 103. These signals together with A-lead signals enable control circuit IC1 to establish the IDLE, BUSY and HOLD states.

When line circuit LC1 is in the HOLD state contact H-1 is closed and shunt detector 103 is operated by the current flow through the hold bridge consisting of resistors 1R1, 1R3 and 1R4, diodes 1D1 and 1D2 and varistor 1V1. While in the HOLD state shunt detector 103 detects the absence of current flow which, if it persists for a prescribed interval, causes a transition of line circuit LC1 from the HOLD state to the IDLE state. The return of line circuit LC1 to the BUSY state from the HOLD state occurs in response to a ground on the A-lead.

Figure 1:
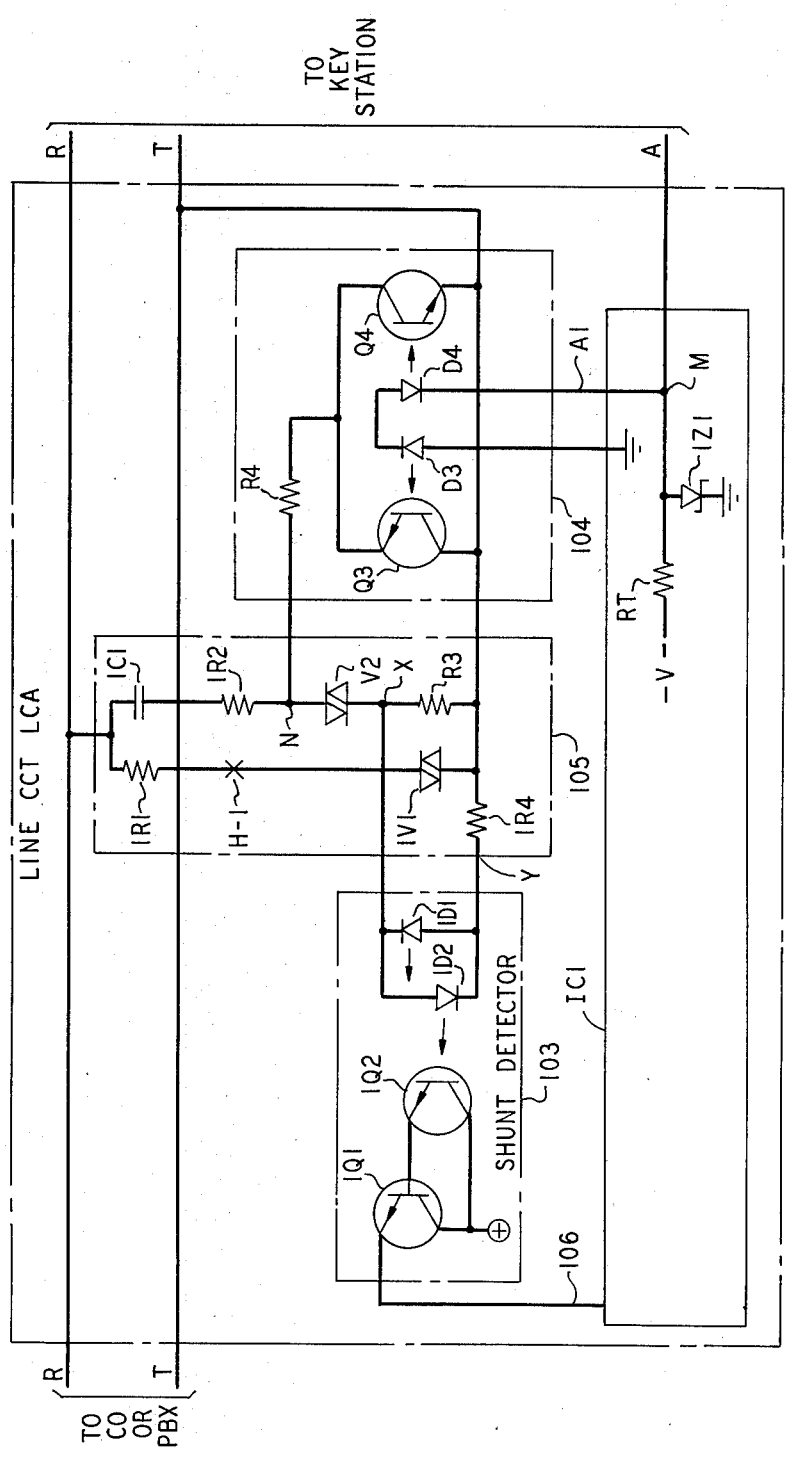
FIG. 1 shows a schematic diagram of the dual sensitivity shunt detector circuit.
Figure 2:
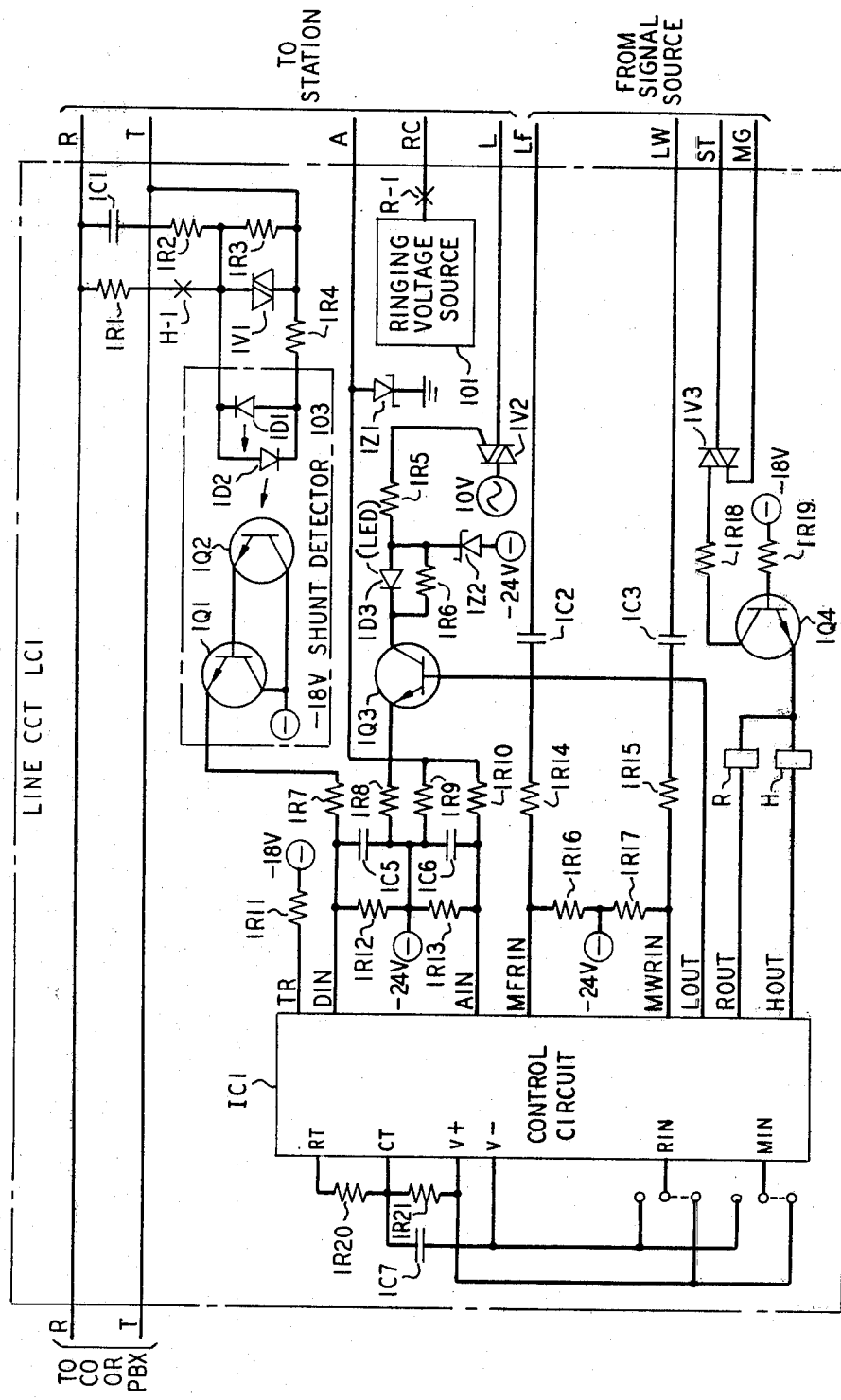
FIG. 2 shows a line circuit including a shunt detector as disclosed in FIG. 1 of R. J. Angner et al, U.S. Pat. No. 4,057,693 issued Nov. 8, 1977.

In FIG. 1, the line circuit incorporating the disclosed dual sensitivity shunt detector is similar to the prior art line circuit of FIG. 2. The differences include the addition of a current shunt or current diverter arrangement 104 and varistor V2. Additionally, the value of resistor R3 of FIG. 1 is different from the value of corresponding resistor 1R3 of FIG. 2. Lead A1 the input to current diverter 104 connects to lead A at node M. The output of current diverter 104 connects between node N and lead T of the communication pair.

Assuming that the key station, connected to line circuit LCA of FIG. 1, is in the IDLE state (ON-HOOK) then a −48 V dc signal is on lead R and a ground signal is on lead T. Since in the IDLE state relay H-1 (HOLD state relay) is inoperative capacitor 1C1 prevents the d.c. voltage from the T and R leads from reaching shunt detector 103. Thus, in the IDLE state shunt detector 103 is responsive only to ac or transients signals coupled via capacitor 1C1. In the IDLE state lead A from the key station is open and current flows through resistor RT through light emitting diodes D3 and D4 to ground. This occurs since the combined voltage drop of diodes D3 and D4 is less than the voltage drop of Zener 1Z1. Referring to FIG. 2, resistor RT represents the equivalent resistance of resistors 1R9 in parallel with series resistors 1R10 and 1R13.

Referring to FIG. 1, the current flow through diodes D3 and D4 causes light coupled transistors (LCT) Q3 and Q4 to switch on. The connection of LCT Q3 and Q4 enable current diverter 104 to divert either positive or negative current away from shunt detector 103 through resistor R4. Hence, in the IDLE state dual sensitivity shunt detector arrangement 103, 104 and 105 is in the reduced sensitivity mode since diverter 104 is activated. During the IDLE state any ac voltage across the T and R leads would have to be the magnitude of a ring signal to activate shunt detector arrangement 103, 104 and 105. As noted previously, during the IDLE (I) state, capacitor 1C1 prevents the dc voltage on lead R from operating shunt detector arrangement 103, 104, 105.

The RING (R) state occurs when a large 20 Hz ac ring voltage is superimposed on lead R during an IDLE (I) state. This ring voltage causes an alternating charging and discharging of capacitor 1C1 through resistor 1R2 and the components connected between node N and lead T. Since lead A from the key station is open during the RING state, positive and negative current flows through current diverter 104 from node N to lead T. Under this condition, current diverter 104 acts as a parallel impedance around the input of shunt detector 103. Thus, shunt detector arrangement 103, 104 and 105 is in the reduced sensitivity mode.

Depending on the amplitude and polarity of the voltage appearing at node N either transistor Q3 or Q4 may saturate. Resistor R4 determines the amount of current diverted through current diverter 104. When the ac ring voltage across the T and R leads is sufficient to cause a current through resistor R4 such that the voltage drop across R4 and Q3 (or Q4) exceeds the threshold of V2, current starts to flow through varistor V2. The threshold voltage when current starts to flow through varistor V2 is approximately equal to the breakdown voltage of V2. Any ac voltage on the T and R leads which is less than this threshold voltage can not operate shunt detector 103. Note, the voltage across node N and lead T must rise to approximately the breakdown voltage of varistor 1V1 and varistor V2 before the voltage across node X and Y is sufficient to cause shunt detector 103 to operate.

Shunt detector 103 does not operate until the voltage across node X and Y causes sufficient current flow through resistor 1R4 and light emitting diodes 1D1 and 1D2 to saturate light coupled transistors 1Q1 and 1Q2. Varistor 1V1 provides a voltage limit across resistor R3 to prevent excess current into resistor 1R4. The sum of the required current flow through resistor 1R4 plus the current flow through resistor R3 and varistor 1V1 must be available through varistor V2 before shunt detector 103 operates. Thus, a double threshold exists, one threshold which allows current to start flowing through varistor V2 and a second threshold at which the current flow through varistor V2 is sufficient to operate shunt detector 103.

During the RING state the operation of current diverter 104 causes a reduced voltage sensitivity mode for the dual sensitivity shunt detector arrangement shown as units 103, 104 and 105 of FIG. 1. Even in this reduced sensitivity mode the ac ring voltage provides sufficient current to both saturate current diverter 104 and to cause light emitting diodes 1D1 and 1D2 to operate light coupled transistors 1Q1 and 1Q2. As shown in FIG. 2 shunt detector 103 provides an output 106 which is inputted to control circuit IC1. As described in the previous referenced Angner patent, control circuit IC1 then operates relay R and causes a lamp flash and audible signal to the connected key station indicating a RING state.

Thus, as described above, current diverter 104 is designed to divert enough current such that the various test signals or noise voltages on the T and R leads can not provide a false ring signal to shunt detector 103 during the IDLE, RING or HOLD states (i.e., when lead A is open). The operation of current diverter 104 during the HOLD state will be discussed in a later paragraph.

When the subscriber answers (i.e., goes OFF-HOOK) at the key station connected to line circuit LCA during the RING state, a ground voltage is placed on the A-lead by the key station. This ground voltage causes node M to be at ground voltage thus diverting all current, which had been flowing through light emitting diodes D3 and D4, to the A-lead. Concurrently, as described in the Angner patent, control circuit IC1 detects this condition and enters the BUSY state.

In the BUSY state, current diverter 104 is disabled since no current flows in diodes D3 and D4. Thus, any signals from the R lead is coupled through capacitor 1C1 and the resulting current in resistor 1R2 flows only through varistor V2. Since current diverter 104 is disabled shunt detector 103 operates at the high sensitivity level. In this operating mode, the value of capacitor 1C1, varistors 1V1 and V2 and resistors 1R2, R3 and 1R4 are selected in a well known manner to provide the desired level of sensitivity for shunt detector 103. Note that resistor 1R1 becomes part of the network only during the HOLD state when relay contact H-1 is closed. Note also that the BUSY state (lead A at ground) is entered by going OFF-HOOK during a RING state, by going OFF-HOOK during an IDLE state or by going OFF-HOOK during a HOLD state.

During the BUSY state with current diverter 104 disabled shunt detector arrangement 103, 104 and 105 is in a more sensitive mode. Thus, when line circuit LCA is used behind a PBX, the shunt detector is sensitive enough to respond to switchhook flashing signals from a connected key telephone. However, even in the more sensitive mode the voltage threshold established by resistors R3 and 1R4 and diodes 1D1 and 1D2 together with varistor V2 prevent shunt detector 103 from responding to dial tone, dialing signals and voice signals which may appear on the T and R leads during a BUSY state. The value of resistor R3 of FIG. 1 is larger than its counterpart resistor 1R3 of FIG. 2 to compensate for the addition of varistor V2. The addition of varistor V2 provides an additional threshold for voltage appearing across shunt detector 103 during the BUSY state. The effect of varistor V2 is that for ac signals on the T and R lead of less than about 1 volt RMS the path from node N to lead T appears as an open circuit. Thus, the insertion loss presented by dual sensitivity shunt detector arrangement 103, 104, 105 in the absence of V2 has been eliminated. Consequently, normal speech, dial tone and TOUCH-TONE signalling are not attenuated by line circuit LCA.

Line circuit LCA enters the HOLD state when the A-lead (lead A) opens during a BUSY state. This occurs when a subscriber at a connected key station depresses the hold key. As described in the Angner patent a lamp wink signal is applied to the line which is in the HOLD state. Since the A-lead is open, current into node M comes from diodes D3 and D4. Consequently, current diverter 104 is active and dual sensitivity shunt detector arrangement 103, 104 and 105 is in its reduced sensitivity mode. However, the effect of current diverter 104 on the sensitivity of the shunt detector is negligible in the HOLD state since most of the current through 1R1 flows through varistor 1V1.

Line circuit LCA enters an IDLE state from the BUSY state by having a subscriber go ON-HOOK at the key station. This operation is described in the referenced Angner patent. An ON-HOOK condition opens the T and R leads during the high sensitivity state and the opening of the A-lead returns line circuit LCA to the IDLE state. Again, the open on the A-lead results in the dual sensitivity shunt detector arrangement 103, 104 and 105 entering its reduced sensitivity mode.

The above described technique of switching the sensitivity of shunt detector arrangement 103, 104 and 105 has enabled line circuit LCA to detect low level voltages on the T and R leads during a BUSY state and yet ignore the larger voltage signals occurring during the IDLE, RING, and HOLD (NON-BUSY) states.

While this disclosure describes a particular dual sensitivity shunt detector arrangement 103, 104 and 105, implementations using other well known components or circuits are contemplated. Additionally, different levels of sensitivity can be implemented for particular applications, operating modes, or for the individual IDLE, RING or HOLD states. For example, when a line circuit is connected to a PBX line the line circuit could be made to operate in one mode and when it is connected to a CO line the line circuit could be made to operate in another mode. In the disclosed implementation, however, the operating modes of the shunt detector arrangement is determined by the operating state of the line circuit.

Likewise, it is contemplated that the sensitivity of shunt detector arrangement 103, 104 and 105 can be made to change as a function of time, signal levels and types, loop length and/or noise levels. Additionally, various combinations of equipment, signal levels or types, noise levels, loop lengths, time or other characteristics of telephone equipment or lines can be utilized as the operating modes which enable the dual sensitivity shunt detector arrangement. Finally, a shunt detector having more than two sensitivity levels is anticipated as within the skill in the art.

We claim:
1. A line circuit for use in a key system for detecting and controlling the operational states of a communication pair extending between a switching machine and at least one telephone station, said line circuit comprising
   a shunt detector means (103, 105) for detecting voltage changes indicative of the operational state of said communication pair
   characterized in that
   said shunt detector means further includes
   a switchable current shunt (104) for changing the sensitivity of said shunt detector means in response to a change in an operational mode of said telephone station.
2. The invention of claim 1 which further includes means (105) for coupling voltages from said communication pair to said shunt detector means and
   characterized in that
   said shunt detector means further includes
   means (R4, Q3, Q4) connected to said coupling means for diverting current from said shunt detector means in response to a change in operational mode of said telephone station.
3. The invention of claim 2
   characterized in that
   said current diverting means includes
   means for bidirectionally diverting current (Q3, Q4) from said detecting means.
4. The invention of claim 3
   characterized in that
   said bidirectional current diverting means includes
   light coupled transistors and
   light emitting diodes for optically coupling control signals to said transistors.
5. The invention of claim 3
   characterized in that
   said shunt detector means further includes means (R4) connected in series with said bidirectional diverting means for establishing a current threshold level to limit the current diverted by said current diverting means.
6. The invention of claim 1 which further includes means (105) having a voltage input means (R, T) and a voltage output means (X, Y), said voltage input means connected across said communication pair for coupling voltages from said communication pair to said shunt detector and
   means (1D1 and 1D2) connected to said voltage output means of said coupling means for detecting voltages outputted from said coupling means
   characterized in that
   shunt detector means further includes
   means (R4, Q3 and Q4) connected to said voltage output means of said coupling means for diverting current from said shunt detector means in response to a change in operational mode of said telephone station.
7. The invention of claim 1
   characterized in that
   said shunt detector means is operable in response to said operation modes including the idle, ring and hold states of said line circuit and inoperable in response to a busy state of said line circuit.
8. The invention of claim 1
   characterized in that
   said shunt detector means is responsive to a signal on an A lead of said line circuit.

9. The invention of claim 1 in which said shunt detector means includes
   coupling means (105) having a voltage input means (R, T) and a low voltage output means (X, Y), said voltage input means connected across said communication pair for coupling voltages from said communication pair to said shunt detector means and
   means (1D1, 1D2) connected to said low voltage output means of said coupling means for detecting voltage transients outputted from said coupling means
   characterized in that
   said coupling means further includes
   a high voltage output means (N, T) and said shunt detector means further includes
   means (R4, Q3, Q4) connected to said high voltage output means of said coupling means for diverting current from said detecting means in response to a change in said operational mode of said telephone station.

10. The invention of claim 9
    characterized in that
    said coupling means includes
    a voltage shifting means (V2) connected between said low voltage output and said high voltage output of said coupling means.

11. A line circuit for use in a key telephone system wherein said line circuit is adapted to control communication over the facility between a central switching machine and a telephone station and to provide visual signals to said telephone station representative of the circuit state of said line circuit, said line circuit having at least idle, ring, hold and busy states
    characterized in that
    said line circuit includes
    means (LCA) coupled to said facility for detecting at two sensitivity levels voltage signals indicative of the operational state of said facility, said dual sensitivity detector means including
    means for detecting voltage signals at a first sensitivity level (103, 105) in response to a busy state control signal from said station and
    means for detecting voltage changes at a second sensitivity level (103, 104, 105) in response to idle, ring or hold state control signals from said station.

12. The invention of claim 11
    characterized in that
    said two level sensitivity detector includes
    a first sensitivity detecting means (103, 105) responsive to a ground signal on an A-lead from said station and
    a second sensitivity detecting means (103, 104, 105) responsive to a non-ground signal on said A-lead.

13. The invention of claim 11 wherein said two sensitivity level detector means includes a voltage signal detector means for providing signals to determine the idle, ring, hold and busy states of said line circuit
    characterized in that
    said first sensitivity detector means (103, 105) is said line voltage detecting means and
    said second sensitivity detector means (103, 104 105) includes
    means for diverting current (104) from said line voltage detecting means in response to idle, ring or hold state control signals from said station.

* * * * *